May 29, 1956  B. W. BEDELL  2,747,286
LINE MEASURING DEVICE
Filed Sept. 24, 1954
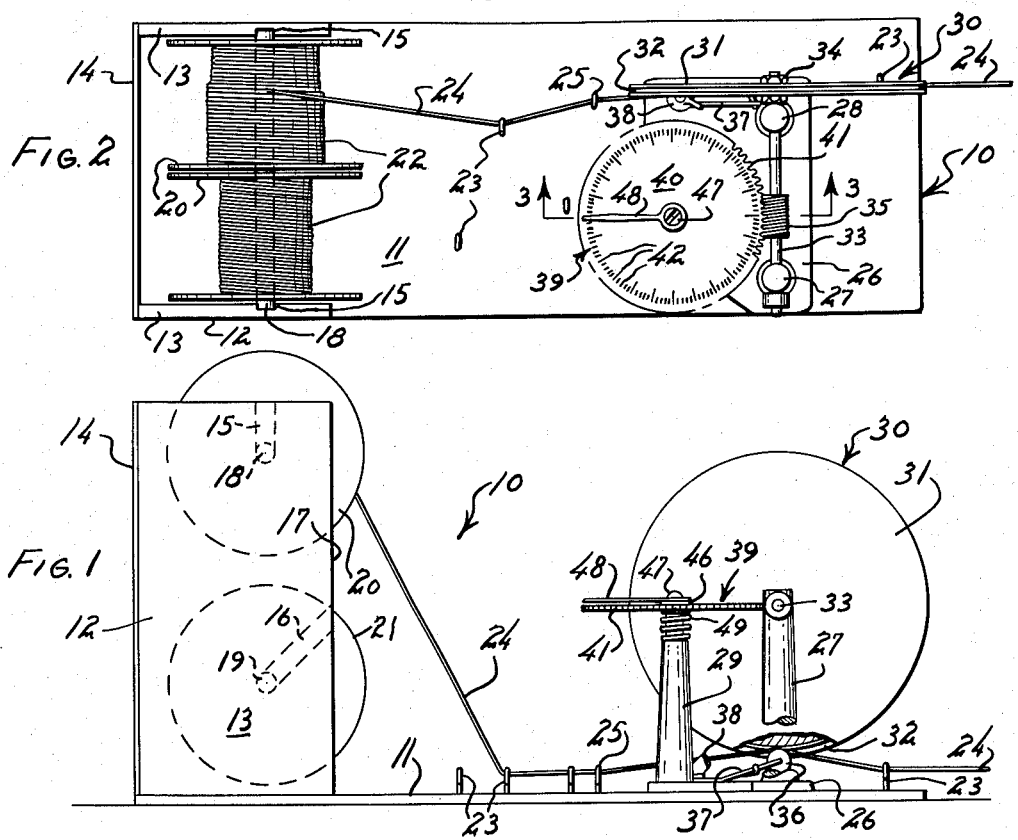
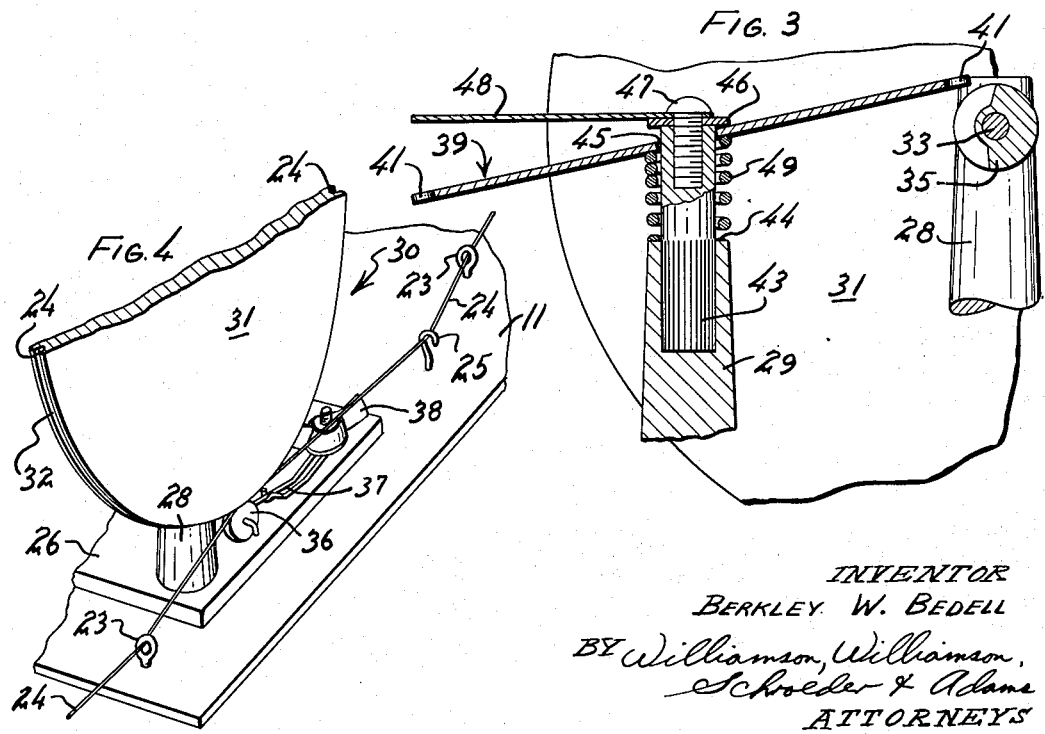
INVENTOR
BERKLEY W. BEDELL
BY Williamson, Williamson,
Schroeder & Adams
ATTORNEYS 2,747,286

LINE MEASURING DEVICE

Berkley W. Bedell, Spirit Lake, Iowa

Application September 24, 1954, Serial No. 458,065

2 Claims. (Cl. 33—134)

This invention relates to a line measuring device and more particularly to a device for measuring a lineal length of line material as it passes a stationary point of observation.

A number of devices have been proposed for measuring an arbitrary length of line from a bulk source and include such simple arrangements as a series of spaced markers on a table top for consecutive adding of short lengths of the line to mechanisms for counting and measuring line which have complicated and intricate parts for accomplishing the aforesaid purpose. Those devices which have counter wheels for totaling lineal measurement are still more complicated and expensive if additional mechanism has been added to the device for resetting the digit wheels to zero starting position after each usage.

This invention contemplates, and it is an important object thereof to provide a device which is extremely simple and inexpensive and which will operate effectively and quickly to measure accurately the length of line material required.

Another object of the invention is to provide a device of the class described in which a main driven portion of the measuring mechanism performs the visually observable counting function and at the same time is directly resettable to a zero position or to any other arbitrary indication relative to the device itself, with the simplest of maneuvers on the part of the operator.

Another object is to provide a simple device for efficiently holding and dispensing line from any of a plurality of bulk spools so that the lineal amount required at any particular instance can be simultaneously measured as that amount is withdrawn from the selected spool.

It is a still further object to provide a device which can cheaply and simply measure lineal lengths of fish line and the like, and which will also provide a convenient and novel display rack for point of sale advertising and dispensing of such lines.

These and other objects and advantages of the invention will more fully appear from the following description made in connection with the accompanying drawing, wherein like reference characters refer to the same or similar parts throughout the several views, and in which:

Fig. 1 is a side elevation of my device with a length of line in position for withdrawal and measuring;

Fig. 2 is a top elevation of the device;

Fig. 3 is an enlarged section detail of the indicator member in tilted relation with respect to the line driven element, taken on the line 3—3 of Fig. 2; and Fig. 4 is an enlarged perspective partial view of the lower portion of the line driven element showing details of the spring-pressed idler wheel and guide means as viewed from the left in Figure 1.

With continued reference to the drawing, my line measuring device has a mounting structure indicated generally at 10 which forms a convenient base for the entire device and may be portable so as to adapt itself for display purposes on counters, tables and the like.

The mounting structure 10 in turn comprises a base board or sheet 11 and an upstanding spool mount 12 which preferably has a pair of side members 13 and a back 14, as shown in Fig. 2. The inner surfaces of the side plates 13 may have opposed grooves 15 at the upper edge and 16 at an angle disposed forwardly and upwardly to terminate at a medial position at the forward edges 17 of the spool mount 12, all as set forth in Figs. 1 and 2. A dowel or shaft 18 can be positioned across the slots 15 while a dowel 19 may be positioned across slotted receivers 16. Each of the dowels or shafts 18 and 19 is adapted to rotatably hold a plurality of spools 20 at the upper position and a plurality of spools 21 at a lower position thereon. Each of the spools 20 or 21 is rotatable independently of all the other spools and is adapted to retain in wound condition a quantity of bulk line material 22 for display and dispensing as will be subsequently disclosed. At a medial position on the base 11 may be disposed a plurality of eye hooks 23 through which one or more lines may be conveniently threaded so as to render convenient the alignment and positioning of the free end 24 of any of the line material 22 for passage through a guide hook 25 in proper position and alignment for actuating the measuring mechanism to be presently described.

Also mounted on the base 11 and forming a part of the mounting structure 10 is a plate 26 having rigid interconnection with the remainder of the mounting structure as shown in Figs. 1 and 2. The plate 26 in turn has a plurality of upstanding posts 27, 28 and 29, each being rigidly formed and in the spaced relation shown in Figs. 1 and 2.

A line driven element indicated generally at 30 is rotatably mounted on the mounting structure and across the posts 27 and 28 and has means adapted to impart rotation thereto in response to the travel of line 24 through the device. The line driven element 30 comprises a wheel 31 having frictional engaging means such as the peripheral groove 32, as shown in Fig. 1, and is secured to a shaft 33 by such means as nuts 34 threadedly secured on one end of shaft 33 as shown in Fig. 1. The shaft 33 is transversely mounted near the upper ends of the posts 27 and 28 and freely rotatable therein. The shaft 33 has rigidly secured intermediate the ends thereof a driving member such as worm gear 35 which is directly rotatable with the rotation of the wheel 31.

Referring now to Fig. 4, the line 24 may be maintained in frictional engagement with the groove 32 of wheel 31 by means of an idler wheel 36 which is mounted for rotation on a spring bracket 37 which is in turn secured as by means of the wing nut and bolt combination 38 shown in Fig. 4. The idler wheel 36 presses upwardly against the peripheral groove 32 in wheel 31 and maintains line 24 in frictional engagement for rotation of wheel 31 in linear proportion to the amount of line 24 which is withdrawn from the bulk line 22 wound on one of spools 20 or 21.

Also mounted on the mounting structure is a rotatably driven indicator member generally shown at 39 in Figs. 1 and 2. The driven indicator member in turn comprises a disc 40 having a circumferential gear 41 adapted to intermesh with the worm gear 35 in normal operation. The disc 40 is provided with indicia 42 disposed marginally of the geared circumference 41 and visible from the upper side of the disc, as shown in Fig. 1. The mounting structure has a post 29 previously noted which terminates in a reduced end 43 and has a shouldered portion 44 as shown in Fig. 3. The disc 40 has a central opening 45 which is preferably slightly larger than the reduced upper end 43 to permit either axial displacement along, or wobbling of, the disc 40 from its normal axis which is coincident with the post or standard 29. An abutment 46 such as a washer member is secured to the upper end of the reduced portion 43 by such means as bolt 47 threaded axially into the upper end 43 and also bears a reference indicator such as the pointer 48 shown in Figs. 1, 2 and 3. The disc 40 is adapted to be rotatably positioned in frictional engagement with the underside of the abutment washer 46 by resilient means preferably in the form of a compression spring 49, as shown in detail in Fig. 3.

In the use and operation of my measuring, displaying and dispensing device, spools of line such as monofilament fish line are mounted upon the dowels or shafts 18 and 19 within the upstanding spool mount 12 as shown. By monofilament line is meant a continuously extruded plastic line having no individual smaller filaments or fibers in its construction. The free ends of the line are maintained in readiness for dispensing, and when a user or purchaser desires to withdraw a predetermined length of line from one of said spools in accordance with the diameter, quality, etc., selected, he threads the free end of the line through the appropriate guide 23 and up to the alignment guide 25, then in contact with the groove 32 of wheel 31 with the idler wheel 36 temporarily sprung out of position to permit entrance of the line. The idler wheel 36 is then replaced in operative position to maintain a linear relation between the rotation of wheel 31 and the length of line 24 which is withdrawn from its appropriate spool. The line 24 may be looped around the wheel 31 if it is desired to increase the frictional contact between the line and the wheel. In the case of fish line, a metered quantity of line may be wound directly on the reel of the equipment as the device measures the required length. As the line 24 passes through the guides, the wheel 31 will be rotated and shaft 33 together with worm 35 will be likewise rotated. The indicator member 39 will be likewise rotated in linear relation by virtue of the driving connection between worm 35 and the geared periphery 41 of disc 40. The indicia 42 indicates the units of length of the line 24 withdrawn from its respective spool, and the pointer 48 will read directly in connection with the rotating disc 40 to give the reading in appropriate measure of length such as feet or yards. The line is then severed and the device remains in readiness for dispensing another predetermined length of line from any one of the spools. The user simply depresses axially or wobbles the disc 40 with respect to post 29 to a position such as shown in Fig. 3, and against the compression of spring 49 which shifts the forward peripheral geared edge 41 out of contact with the worm 35. While held in this position, the indicator disc is rotated until the reset position desired, usually zero, is in alignment with the reference pointer 48. The disc 40 is then allowed to snap back into its abutting relation with washer 46 which automatically re-engages the gear teeth 41 with worm gear 35. The device is then in readiness to measure directly another length of line.

It may thus be seen that I have devised a novel and useful device for displaying, dispensing and measuring fish line and the like, the device having simple provision for resetting the measuring elements directly and without complicated mechanism.

It will, of course, be understood that various changes may be made in the form, details, arrangement and proportions of the various parts without departing from the scope of my invention.

What I claim is:

1. A measuring device for determining the length of a line comprising, a mounting structure, a wheel rotatably mounted on the mounting structure and having a periphery adapted to frictionally engage a line and be rotated proportionately to the travel of said line, said wheel being provided with an axial shaft, a worm drive on said shaft, a disc having radially toothed circumference rotatably mounted on a fixed axis disposed laterally to that of said wheel and normally in driving connection with the worm drive, a reference pointer fixed with respect to said mounting structure, and resilient means bearing on said disc and permitting forcible displacement of said disc out of its axial position and driving connection with the worm drive to permit rotation by manually grasping the toothed circumference and resetting thereof with respect to said reference pointer.

2. A device for displaying, dispensing and measuring fishline and the like comprising, a mounting structure, a plurality of spools each containing bulk line and rotatably mounted for display on said mounting structure, a peripherally grooved line driven wheel element rotatably mounted on said mounting structure and adapted to receive a complete loop of fishline in its grooved circumference, at least one of said plurality of spools containing bulk line the convolutions of which are laterally displaced from the plane of said line driven wheel, a rotatably driven indicator member having linear driving connection with the line driven element and adapted to be manually shifted out of said driving connection for rotation into a new setting with respect to the driven wheel, and line guides mounted in fixed position with respect to the line driven wheel directing line from a selected spool into alignment with the line driven element, whereby said line may be pulled in frictional engagement with the driven wheel for dispensing and measuring thereof irrespective of misalignment of the looped line with respect to the spool from which it is dispensed.

References Cited in the file of this patent

UNITED STATES PATENTS

| | | |
|---|---|---|
| 7,314 | Whiton | Apr. 23, 1850 |
| 357,136 | Tindall | Feb. 1, 1887 |
| 1,039,468 | Wiswell | Sept. 24, 1912 |
| 1,225,128 | Heimark | May 8, 1917 |